United States Patent
Magen et al.

(10) Patent No.: US 11,589,599 B2
(45) Date of Patent: Feb. 28, 2023

(54) POLYHALITE ENRICHED ANIMAL FEED

(71) Applicant: ICL EUROPE COOPERATIEF U.A., Amsterdam (NL)

(72) Inventors: Hillel Magen, Omer (IL); Menachem Assaraf, Lehavim (IL); Amir Gerber, Sheizaf (IL)

(73) Assignee: ICL EUROPE COOPERATIEF U.A., Amsterdam (NL)

( * ) Notice: Subject to any disclaimer, the term of this patent is extended or adjusted under 35 U.S.C. 154(b) by 0 days.

(21) Appl. No.: 17/051,082

(22) PCT Filed: May 5, 2019

(86) PCT No.: PCT/IL2019/050504
§ 371 (c)(1),
(2) Date: Oct. 27, 2020

(87) PCT Pub. No.: WO2019/215724
PCT Pub. Date: Nov. 14, 2019

(65) Prior Publication Data
US 2021/0051980 A1    Feb. 25, 2021

Related U.S. Application Data

(60) Provisional application No. 62/668,724, filed on May 8, 2018.

(51) Int. Cl.
| | | |
|---|---|---|
| *A23K 20/22* | (2016.01) | |
| *A23K 20/147* | (2016.01) | |
| *A23K 20/158* | (2016.01) | |
| *A23K 20/163* | (2016.01) | |
| *A23K 20/24* | (2016.01) | |
| *A23K 20/26* | (2016.01) | |
| *A23K 50/75* | (2016.01) | |
| *A23K 50/80* | (2016.01) | |

(52) U.S. Cl.
CPC ............ *A23K 20/22* (2016.05); *A23K 20/147* (2016.05); *A23K 20/158* (2016.05); *A23K 20/163* (2016.05); *A23K 20/24* (2016.05); *A23K 20/26* (2016.05); *A23K 50/75* (2016.05); *A23K 50/80* (2016.05)

(58) Field of Classification Search
CPC .... A23K 20/22; A23K 20/147; A23K 20/158; A23K 20/163; A23K 20/24; A23K 50/26; A23K 50/75; A23K 50/80; A23K 20/26; A23K 50/10; C05F 7/00; C05F 7/04; E21C 41/20; A23V 2002/00; Y02A 40/81; Y02A 40/818
USPC ........................................................ 426/74
See application file for complete search history.

(56) References Cited

U.S. PATENT DOCUMENTS

| | | | | | |
|---|---|---|---|---|---|
| 2,512,537 | A | * | 6/1950 | Zellers .................... | A23K 20/24 426/62 |
| 2006/0165840 | A1 | * | 7/2006 | Breivik .................. | A23B 4/044 426/2 |
| 2006/0216396 | A1 | * | 9/2006 | Abbas .................... | A23K 50/10 426/635 |
| 2006/0226051 | A1 | * | 10/2006 | Navarrette ............. | B03D 1/016 209/166 |
| 2013/0303474 | A1 | * | 11/2013 | Rho ........................ | A61P 37/00 514/34 |
| 2018/0360732 | A1 | * | 12/2018 | Maddahi .................. | A61K 8/60 |

FOREIGN PATENT DOCUMENTS

| | | |
|---|---|---|
| CN | 103947866 A | 7/2014 |
| WO | 9511205 A1 | 4/1995 |
| WO | 2008084074 A2 | 7/2008 |
| WO | 2017210768 A1 | 12/2017 |
| WO | 2018050860 A1 | 3/2018 |

OTHER PUBLICATIONS

NPL Ferreira et al. (in Can J Anim. Sci. 99: 962-965, 2019). (Year: 2019).*
NPL Sarker A et al. (in World Journal of pharmaceutical Research vol. 5 (12): pp. 407-416, 2016) (Year: 2016).*
Prior art Google scholar web search printable History retrieved on Apr. 23, 2021. This search retrieved the above NPL Sarker A et al. prior art used as prior art in the office action. (Year: 2021).*
NPL Fish as animal retrieved on Apr. 23, 2021. (Year: 2021).*
NPL Polyhalite (From NPL Sirius Minerals 2015). (Year: 2015).*
NPL Mineral amount ( Mineral supplement of Beef Cattle year 2007). (Year: 2007).*
NPL Thompson et al. (Applicants provided information, 2015). (Year: 2015).*
Written Opinion of International Searching Authority; dated Aug. 25, 2019.
DairyCattleExtension.Org "How many pounds of feed does a cow eat in a day" DAIReXNET Aug. 16, 2019 (retrieved Sep. 26, 2021) 1 page.
fishfeedextruder.com How to Feed Tilapia in Different Growth Stages&How Much Nutrition They Need (retrieved Sep. 26, 2021) 5 pages.
How Much Feed Does a Chicken Eat—Fresh Eggs Daily® (Retrieved Sep. 26, 2021) 19 pages.
Banrie: "Principles of fish nutrition", The Fish Site, Mar. 4, 2013 (Mar. 4, 2013), pp. 1-19, XP055811487, Retrieved from the Internet: URL:https://thefishsite.com/articles/principles-of-fish-nutrition [retrieved on Jun. 8, 2021].
European Search Report for App. No. EP19800237.0, dated Dec. 20, 2021, 5 pages.
Jane Byrne: "Sirius strikes feed market deal for four-in-one potash mineral supplement", Feed Navigator, Jan. 26, 2015 (Jan. 26, 2015), pp. 1-2, XP055811465, Retrieved from the Internet: URL:https://www.feednavigator.com/Article/2015/01/26/Sirius-strikes-feed-market-deal-for-four-in-one-potash-mineral-supplement [retrieved on Jun. 8, 2021].

(Continued)

*Primary Examiner* — Erik Kashnikow
*Assistant Examiner* — Bhaskar Mukhopadhyay
(74) *Attorney, Agent, or Firm* — Alphapatent Associates, Ltd; Daniel J. Swirsky

(57) ABSTRACT

There is provided an animal feed composition comprising Polyhalite in a concentration between 0.5%-5% w/w.

4 Claims, 15 Drawing Sheets

(56) References Cited

OTHER PUBLICATIONS

Office Action (Non-Final Rejection) dated Dec. 20, 2022 for U.S. Appl. No. 17/233,490 (pp. 1-9).

* cited by examiner

| Age (d) | Con | 0.5 | 0.75 | 1.5 | 2 | 5 | Prob. (f) |
|---|---|---|---|---|---|---|---|
| BC: day 0 to 17 g. (n = 60) | | | | | | | |
| 0 | 24.41±36.0 | 24.41±0.36 | 24.41±36.0 | 24.41±0.35 | 41.25±36.0 | 25.41±36.0 | NS |
| 7 | 58.176±20.2 | 14.176±2.19 | 50.179±18.2 | 07.174±2.17 | 10.181±17.2 | 40.175±19.2 | NS |
| 14 | 70.475±15.6ª | 44.477±6.15ª | 28.488±10.6ª | 47.473±6.26ª | 62.477±10.6ª | 93.441±21.6ᵇ | <0.001 |
| 17 | 97.650±08.9ª | 47.657±9.24ª | 200.670±00.9ª | 60.646±9.32ª | 654.87±08.9ª | 17.608±9.24ᵇ | 0.0001 |
| IC: Day 17 to 35 g. (n = 40) | | | | | | | |
| 21 | 899.35±11.99ª | 879.33±11.99ª | 906.68±12.30ª | 872.16±12.30ª | 34.872±12.15ª | 804.00±12.15ᵇ | <0.001 |
| 28 | 1518.18±25.52ª | 1512.70±24.88ª | 1556.03±26.22ª | 1496.86±26.22ᵃᵇ | 1531.23±25.19ª | 1392.47±25.52ᵇ | 0.0003 |
| 35 | 2231.03±33.89ᵃᵇ | 2239.47±34.36ᵃᵇ | 2295.69±34.85ª | 2221.82±35.36ᵃᵇ | 2268.82±33.01ª | 2109.05±34.36ᵇ | 0.0048 |

| Age (d) | Con | 0.5 | 0.75 | 1.5 | 2 | 5 | Prob (f) |
|---|---|---|---|---|---|---|---|
| BC: day 0 to 17 g/d | | | | | | | |
| 0-7 | 30.19±0.30 | 26.19±0.30 | 19.75±0.30 | 97.18±0.30 | 97.19±0.30 | 15.19±0.30 | NS |
| 7-14 | 73.42±71.0ᵃ | 43.04±0.71ᵃ | 11.44±70.0ᵃ | 47.42±72.0ᵃ | 36.42±70.0ᵃ | 05.38±71.0ᵇ | <0.0001 |
| 14-17 | 80.59±34.1ᵃᵇ | 41.61±1.37ᵃ | 63.60±32.1ᵃᵇ | 45.57±37.1ᵃᵇ | 50.58±34.1ᵃᵇ | 21.55±37.1ᵇ | 0.0186 |
| IC: Day 17 to 35 g/d (n = 40) | | | | | | | |
| 17-21 | 58.74±2.36ᵃ | 52.95±2.36ᵃᵇ | 56.38±2.42ᵃᵇ | 51.49±2.42ᵃᵇ | 50.54±2.39ᵃᵇ | 44.58±2.39ᵇ | 0.0010 |
| 21-28 | 86.72±2.94 | 98.48±2.87 | 93.27±3.02 | 88.58±3.02 | 94.70±2.90 | 84.35±2.94 | 0.15 |
| 28-35 | 101.19±3.17 | 100.30±3.22 | 104.87±3.26 | 100.25±3.31 | 105.37±3.09 | 96.43±3.22 | 0.37 |
| n= at day 35 | 37 | 36 | 35 | 34 | 39 | 36 | NS |

Fig. 7

| Age (d) | Con | 0.5 | 0.75 | 1.5 | 2 | 5 | Prob.(f) |
|---|---|---|---|---|---|---|---|
| BC: day 0 to 17 g/d (n = 60) | | | | | | | |
| BW 17d | 97.650±08.9[a] | 47.657±9.24[a] | 200.670±00.9[a] | 60.646±9.32[a] | 654.87±08.9[a] | 17.608±9.24[b] | 0.0001 |
| Feed intake 0-17d (n=4x15) Kg | 11.595[ab] | 11.86[ab] | 12.445[a] | 11.58[ab] | 12.19[ab] | 11.435[b] | 0.0153 |
| FCR 0-17d | 1.29 | 1.35 | 1.31 | 1.36 | 1.34 | 1.39 | NS |
| IC: Day 17 to 35 g/d (n = 40) | | | | | | | |
| BW 35d | 2231.03±33.89[ab] | 2239.47±34.36[ab] | 2295.69±34.85[a] | 2221.82±35.36[ab] | 2268.82±33.01[a] | 2109.05±34.36[b] | 0.0048 |
| Feed intake 17-35d Kg (indv.) | 2.43 | 2.43 | 2.49 | 2.47 | 2.54 | 2.47 | NS |
| FCR 17-35d | 1.562[b] | 1.531[b] | 1.526[b] | 1.584[ab] | 1.558[b] | 1.628[a] | <0.0001 |

Fig. 9

| Age (d) | Con | 0.5 | 0.75 | 1.5 | 2 | 5 | Prob (f) |
|---|---|---|---|---|---|---|---|
| Body weight 35d (g) | 2231.03±33.89ab | 2239.47±34.36ab | 2295.69±34.85a | 2221.82±35.36ab | 2268.82±33.01a | 2109.05±34.36b | 0.0048 |
| Slaughter BW (g) | 2121.22±28.6ab | 2162.10±29.5a | 2200.79±29.9a | 2109.35±29.9ab | 2170.42±28.3a | 2023.46±29.5b | 0.0007 |
| Breast weight (g) | 443.31±8.21b | 457.46±8.34ab | 486.24±8.59a | 449.62±8.34b | 451.31±8.00b | 439.59±8.73b | 0.0026 |
| Breast (% of slaughter BW) | 20.93±0.20b | 21.23±0.20ab | 21.84±0.22a | 21.28±0.21ab | 20.86±0.20b | 21.51±0.22ab | 0.0118 |
| Breast (% of slaughter BW) 48h post-mortem | 20.61±0.20bc | 20.88±0.21ab | 21.46±0.22a | 20.81±0.21bc | 20.46±0.20c | 21.13±0.22ab | 0.0133 |
| Abdominal Fat (% of slaughter BW) | 1.25±0.05 | 1.18±0.05 | 1.23±0.05 | 1.3±0.05 | 1.16±0.05 | 1.14±0.05 | ns |
| Liver (% of slaughter BW) | 1.57±0.03c | 1.61±0.03bc | 1.64±0.03bc | 1.62±0.03bc | 1.69±0.03ab | 1.76±0.03a | <0.0001 |
| Heart (% of slaughter BW) | 0.42±0.01b | 0.43±0.01b | 0.43±0.01b | 0.44±0.01b | 0.44±0.01b | 0.49±0.01a | 0.0354 |

Fig. 12

POLYHALITE ENRICHED ANIMAL FEED

FIELD OF THE INVENTION

The present invention relates to an animal feed composition that comprises Polyhalite and a process for the preparation thereof.

BACKGROUND OF THE INVENTION

The costs of animal and marine feeds comprise a major portion of the expenses incurred in the farming of these animals.

In poultry, for example, feed efficiency is a major variable that determines the final cost of a kilogram of poultry meat. Depending on the country and species concerned, the proportion of feed in the broiler's farming running costs ranges from 40 to 70% of the total cost of production. The Feed Conversion Ratio (FCR), which varies depending on the type of production applied, is always a very helpful benchmark to determine the profitability of a farm. When aiming to increase the revenue of the poultry enterprise, it is important to improve the Feed Conversion Ratio and thus reduce the feed costs.

Aquaculture is the fastest growing sector in agriculture with an annual growth rate of close to 10%. This is due to the fact that world fisheries have reached a plateau while the demand for fish is growing. Tilapia fish are rapidly growing sector of aquaculture with the current world production reaching 4.5 million tons per year. For comparison—the Salmon annual production reaches only 1.4 million tons.

In a typical aquaculture farm, fish feed represents about 50-60% of the total direct production expenses. Since the cost of feed is the major expense in the fish production unit, any change that will lead to more efficient utilization of the feed will have a substantial impact on the profitability of these production systems in addition to the beneficial environmental effects.

Fish utilize protein for energy purposes and therefore compared to terrestrial animal feeds, fish feeds are rich in proteins, often amounting to 40-50% of the feed. Usually the source of protein is fishmeal that is becoming a rare and expensive commodity. The nitrogenous products (ammonia, nitrite and nitrate) and phosphorous stemming from either leftover food, or partially digested protein and food are harmful to the fish themselves, can lead to growth retardation and at high levels cause mortality. A reduction in the amount of food wastage produced by the fish and especially those harmful to the environment will enable substantial saving on production of fish at high densities; concomitantly the effluents of the fish farms will not have an adverse impact on the environment.

BRIEF DESCRIPTION OF THE DRAWINGS

The present invention will become fully understood from the detailed description given herein below and the accompanying drawings, which are given by way of illustration and example only, and thus not limiting in any way, wherein:

FIG. 5 illustrates a table demonstrating the mean BW of chicks, in accordance with some demonstrative embodiments.

FIG. 7 illustrates a table demonstrating the mean WG calculated when the birds were held in brooding cages, in accordance with some demonstrative embodiments.

FIG. 9 illustrates a table representing the mean BW, Feed intake and FCR of chicks, in accordance with some demonstrative embodiments.

FIG. 12 illustrates a table demonstrating the effect of the additive treatments on slaughter BW, relative breast at slaughter and after 48 h, abdominal fat, heart and liver weights (% from slaughter BW) at the age, in accordance with some demonstrative embodiments.

SUMMARY OF THE INVENTION

Figure 1:
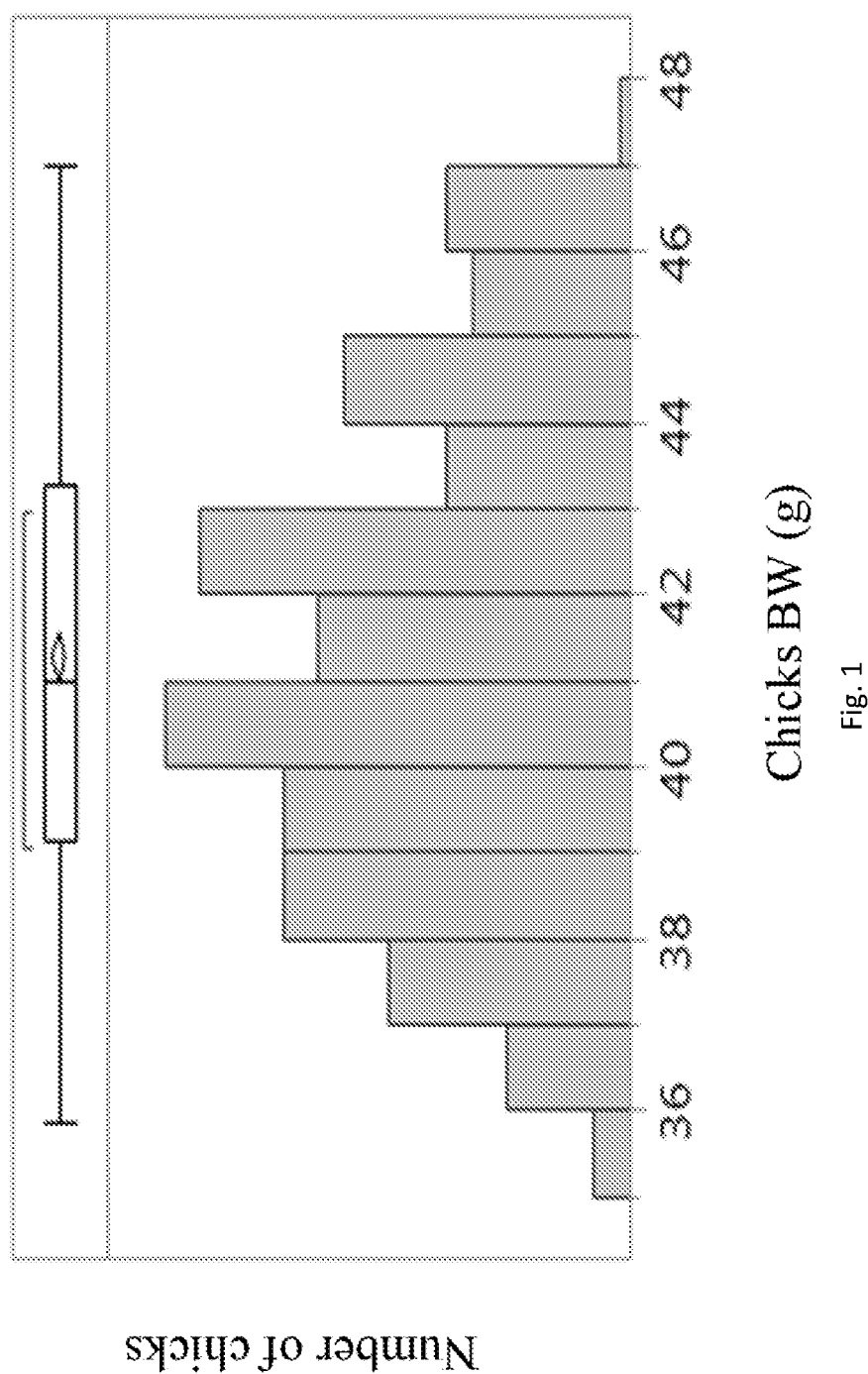
FIG. 1 is an illustration of a graph depicting the body weight variance among 0 d old Ross chicks (n=400), in accordance with some demonstrative embodiments.

According to some demonstrative embodiments, there is provided herein an animal feed composition comprising Polyhalite in a concentration between 0.5%-5% w/w.

According to some embodiments, the animal may be selected from the group including, poultry, bovine, and fish.

According to some embodiments, the Polyhalite is in a concentration between 0.75%-2% w/w.

According to some embodiments, the composition may be fed to poultry and includes Polyhalite in a concentration of 0.75% w/w.

According to some embodiments, the composition is fed to poultry and includes Polyhalite in a concentration of 2% w/w.

According to some embodiments, the composition may be fed to said animal on a daily basis.

DETAILED DESCRIPTION OF THE INVENTION

According to some demonstrative embodiments, there is provided herein an animal feed enriched with Polyhalite.

Polyhalite is an evaporite mineral, a hydrated Sulfate of Potassium, Calcium and Magnesium with formula: $K_2Ca_2Mg(SO_4)_4 \cdot 2H_2O$.

According to some embodiments, the addition of Polyhalite to the animal diets may provide a positive effect on the growth of the animals and/or on feed utilization.

According to some embodiments, Polyhalite may be added to animal feed to be used as a growth enhancer for farm animals since Potassium and Sulphur are known to take part in the metabolism of the animals and Potassium is the third mineral in order of importance following Phosphorus and Calcium.

According to some demonstrative embodiments, the term "animal" as used herein may refer to any member of the kingdom Animalia, including for example, domesticated livestock and animal husbandry, such as, Chickens, cattle, sheep, pigs; marine (oceanic) or freshwater fish and the like.

According to some demonstrative embodiments, there is provided herein an animal feed composition comprising Polyhalite in a concentration between 0.5%-5% w/w, preferably, between 0.75%-2% w/w.

According to some embodiments, the composition may be fed to said animal on a daily basis.

According to some demonstrative examples, there is provided a method for producing an animal feed comprising polyhalite, wherein said method comprises mixing polyhalite, e.g., in a pellet, granule, powder or dust form, with a feed, e.g., a fodder and/or forage.

According to some embodiments, a general process for the manufacture of animal feed may include the steps of: Grinding of raw materials, mixing, pelltizing, cooling, crumbling, quality inspection, weighing and packaging and storage.

According to some embodiments, polyhalite is preferably added at one or more of the following steps: grinding, mixing, pelletizing and/or crumbling.

According to some embodiments the polyhalite may be coated with one or more layers to enable discharge in the gastrointestinal track of an animal.

According to some demonstrative examples, there is provided a method for producing a fish feed comprising polyhalite, wherein said method comprises mixing polyhalite, e.g., in a pellet, granule, powder or dust form, preferably in powder form, with the feed.

According to some embodiments, modern fish feeds are made by grinding and mixing together ingredients such as fishmeal, vegetable proteins and binding agents such as wheat. Water may be added and the resulting paste is extruded through holes in a metal plate. The diameter of the holes sets the diameter of the pellets, which can range from less than a millimeter to over a centimeter. As the feed is extruded it is cut to form pellets of the required length. The pellets are dried and oils are added. Adjusting parameters such as temperature and pressure enables the manufacturers to make pellets that suit different fish farming methods, for example feeds that float or sink slowly and feeds suited to recirculation systems. The dry feed pellets are stable for relatively long periods, for convenient storage and distribution.

According to some embodiments, Polyhalite may be added to normal animal feed (grains as corn, wheat, etc.), of all growth stages and mixed mechanically.

According to some other embodiments, with regard to fish feed, the Polyhalite may be added to the fish feed (bone ash, proteins, etc.) and may be extruded, to get a pellet shaped particle feed.

According to some embodiments, the Polyhalite may be dissolved in an aqueous environment in a continuous release manner, and this may have an impact of the uptake of the nutrients by the animals.

Moreover, it is possible that the animal stomach acidity has also an impact on the Polyhalite dissolution in the animals.

According to some embodiments a Standard grade of polyhalite may be used for incorporation into an animal and/or fish feed, however, in accordance with some other embodiments, other Polyhalite products and/or appearances may be used, including, for example, the Granular (up to 5 mm particles) and the Mini-Granular (up to 2 mm particles), and their mixtures in various percentages.

According to some embodiments, polyhalite may be added at the grinding and/or mixing stage.

According to some embodiments, the polyhalite may be added to fish food, especially to feed juvenile fish since in these fish the results would be more pronounced. According to some embodiments the polyhalite may be added on top of the regular diet components leading to a proportional reduction in all the other ingredients of the diet. According to these embodiments, this may enable replacing expensive fish diet ingredients with polyhlite, which is considered a much cheaper ingredient, e.g., especially since the addition of polyhalite to the diet resulted in a positive effect (better growth and FCR) when added at a 0.75%-3% concentration, preferably at a 1-2% concentration.

According to some demonstrative embodiments, there is provided herein a fish feed comprising at least 30% protein w/w; 2% fat w/w; 3% fiber w/w; 0.5% phosphorous w/w; 0.5% calcium w/w; and 1% Polyhalite w/w According to some embodiments, the fish feed composition may include 35% protein w/w; 4% fat w/w; 5% fiber w/w; 1.2% phosphorous w/w; 1.2% calcium w/w; and 2% Polyhalite w/w

EXAMPLES

Example 1

Experimental Design

All the procedures in this study were carried out in accordance with the accepted ethical and welfare standards of the Israel Ethics Committee (permission #IL-734/17).

Polyhalite: the additive was given to the chicken in the form of powder and the feed formula was provided at a level of grinding (to powder) that was fit to the growth stages of the chicken from hatching to market size.

A total of 400 day-old male broiler chicks, from Ross 308 strain, were obtained from a breeder flock of hens, during their optimal period of egg production (37-wk-old). The chicks were individually weight, 360 chicks with a body weight (BW) of 41±5 g were selected. Each chick was individually tagged.

Reference is now made to FIG. 1 which illustrates a graph depicting the body weight variance among 0 d old Ross chicks (n=400)

The 360 chicks were divided according to their BW into 6 dietary treatment groups (n=60 per group) with similar starting weight. Each dietary treatment was divided into 4 battery cages where the chicks grew together until the age of 14 days (15 chicks×4 battery cages for each treatment).

Figure 2:
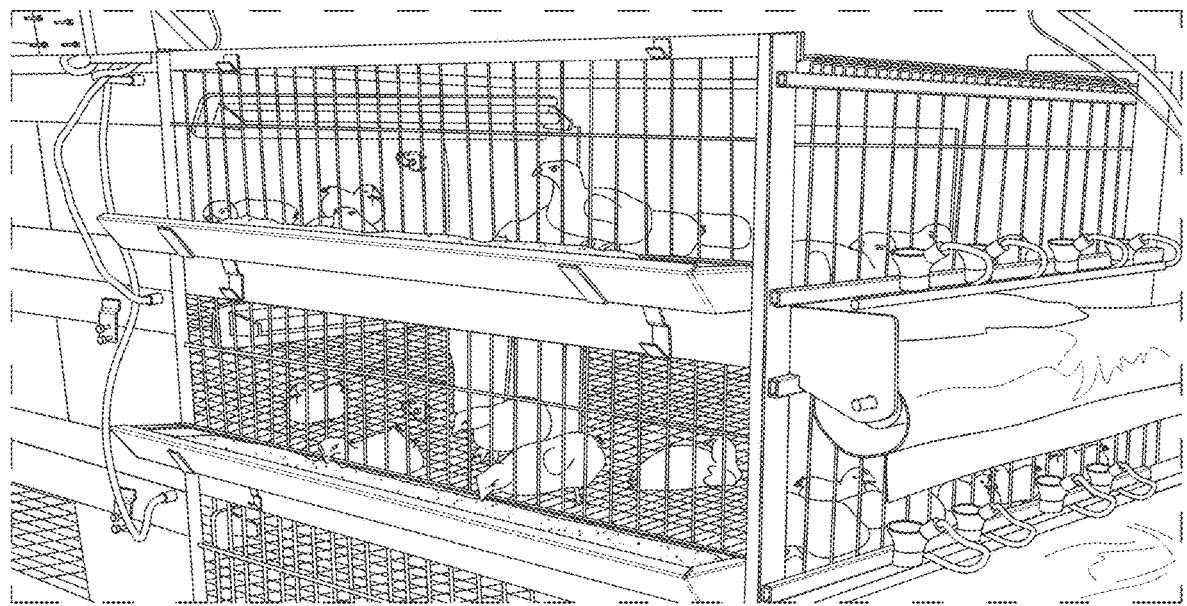
FIG. 2 includes photos of brooding cages, each cage housing 15 chicks, in accordance with some demonstrative embodiments.
Figure 2:
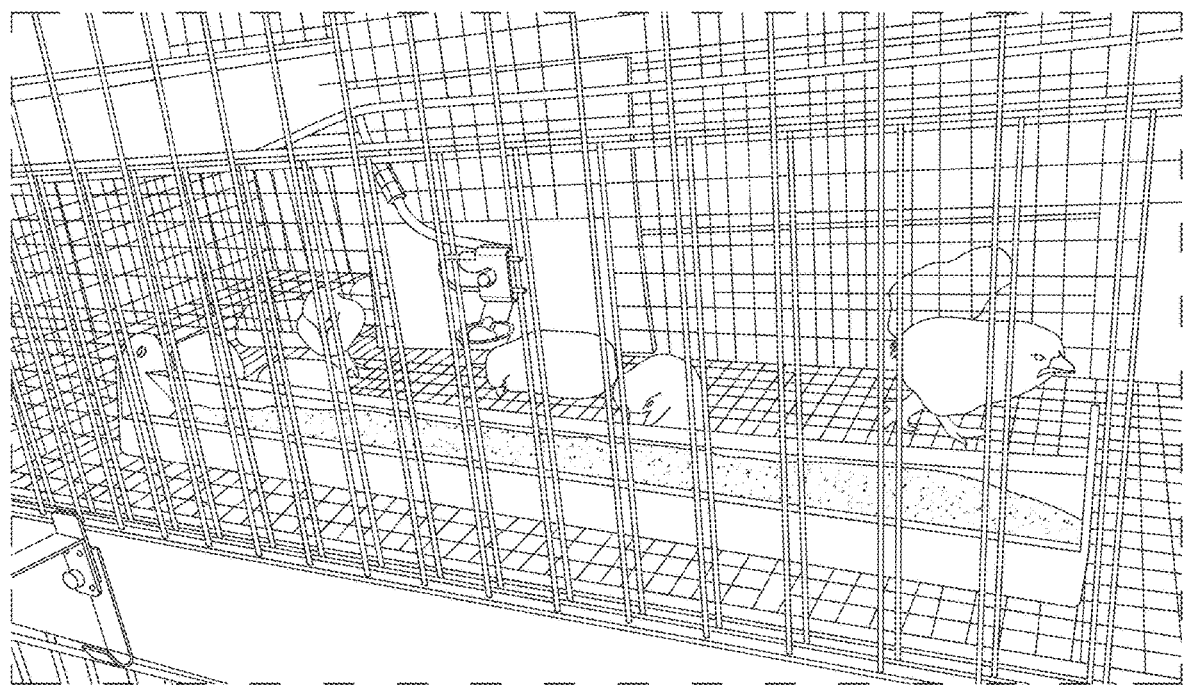

Reference is made to FIG. 2, which depicts brooding cages, each cage housing 15 chicks.

Figure 3:
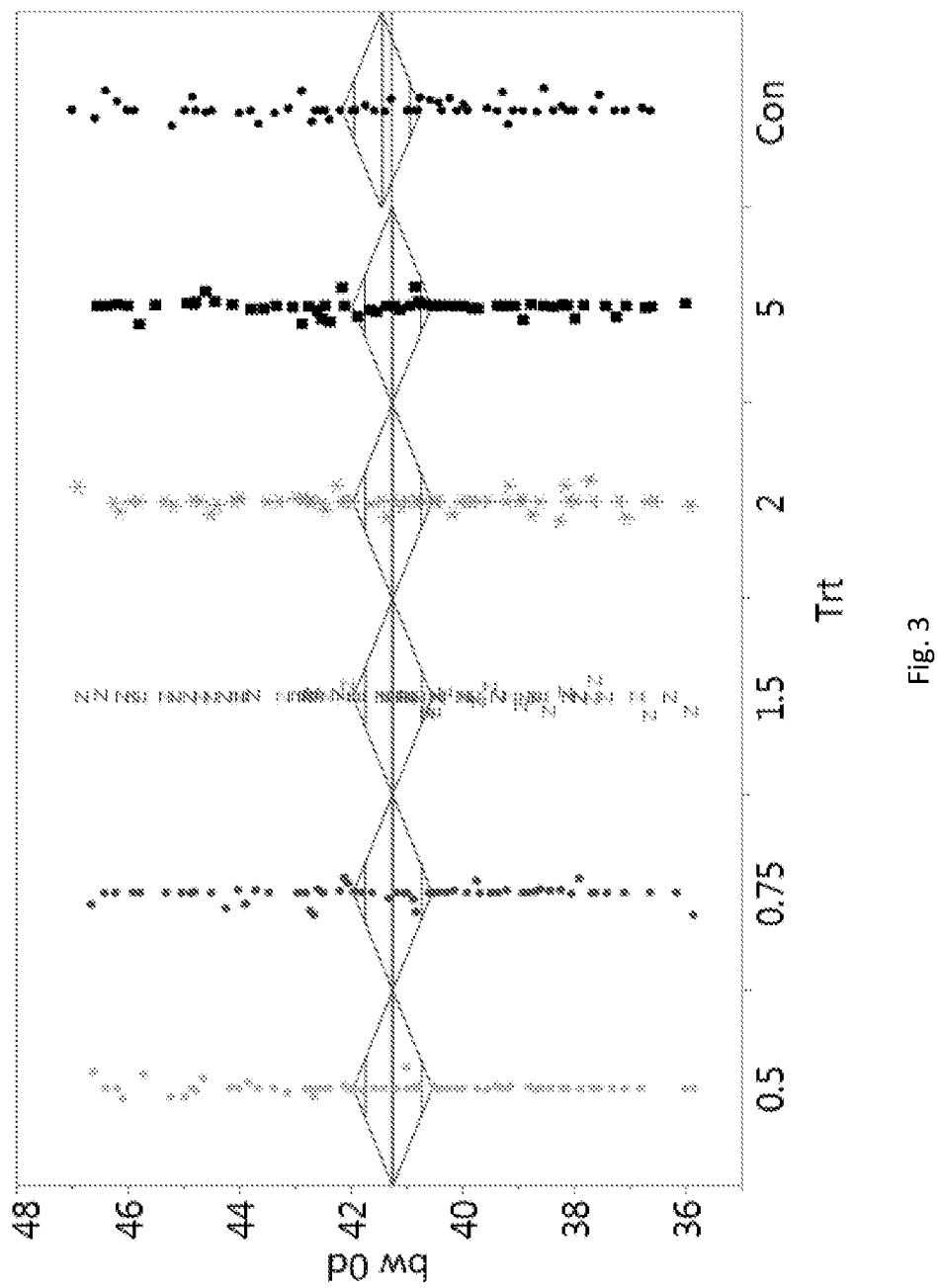
FIG. 3 illustrates a graph depicting 360 selected chicks that were divided according to their BW into 6 dietary treatment groups (n=60 per group) with similar starting weight, in accordance with some demonstrative embodiments.

FIG. 3 illustrates a graph depicting 360 selected chicks that were divided according to their BW into 6 dietary treatment groups (n=60 per group) with similar starting weight.

Table 1 below presents the data of these treatment groups depicted in FIG. 3:

TABLE 1

| Level | Number | Mean | Std Error | Lower 95% | Upper 95% |
|---|---|---|---|---|---|
| 0.5% | 60 | 41.2462 | 0.36008 | 40.538 | 41.954 |
| 0.75% | 60 | 41.2498 | 0.36008 | 40.542 | 41.958 |
| 1.5% | 60 | 41.2490 | 0.36008 | 40.541 | 41.957 |
| 2% | 60 | 41.2510 | 0.36008 | 40.543 | 41.959 |
| 5% | 60 | 41.2597 | 0.36008 | 40.552 | 41.968 |
| Con | 60 | 41.3490 | 0.36008 | 40.741 | 42.157 |

The dietary treatment groups included: Control (C) the regular powdered feed given to broilers, C+0.5% Polyhalite (PS), C+0.75% PS, C+1.5% PS, C+2% PS, and C+5% PS.

On day 14, 40 selected chicks from each dietary treatment were transferred to individual cages with individual feeders where each individual chick was housed on its own. Water and feed in mash form, were available for ad-libitum consumption. The standard diets were designed to meet the breeder recommendations. The birds were held under the recommended temperature regime (starting from 34° C. on day of hatch to 24° C. from day 21 onwards) with 55% Relative humidity and 20:4 h of lights.

Each chick was weighed every week and its individual weekly food intake was calculated. At the end of the experiment, at the age of 35 days, the chicken were individually weighed and the feed was removed 12 hours before slaughter. Breast muscle, abdominal fat pad, heart and liver were removed and weighed, and their weights calculated relative to their live body weight.

Figure 4:
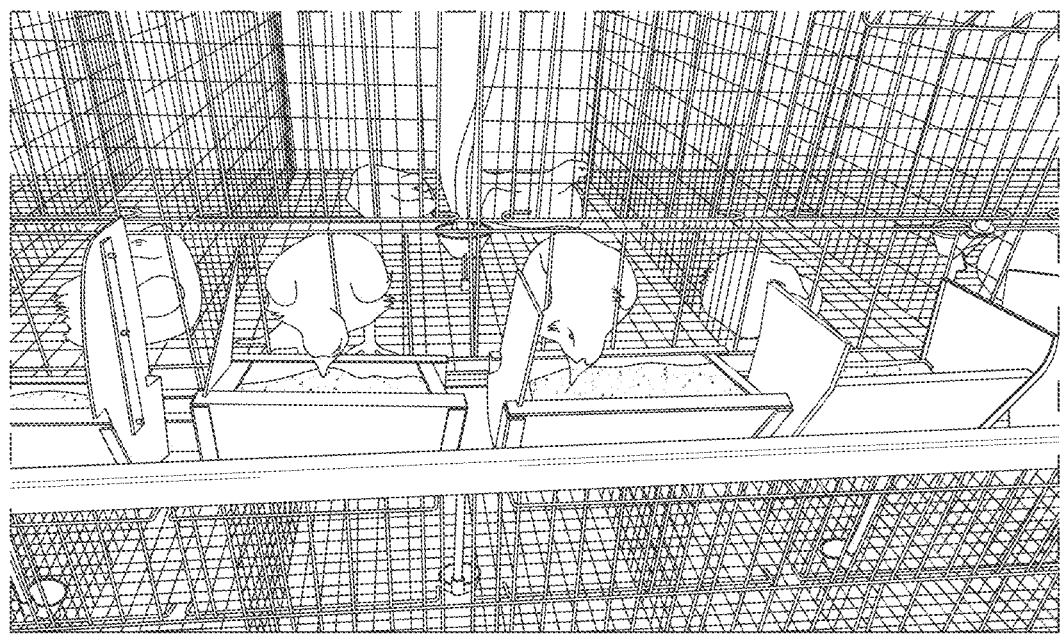
FIG. 4 illustrates pictures of chickens, in accordance with some demonstrative embodiments.
Figure 4:
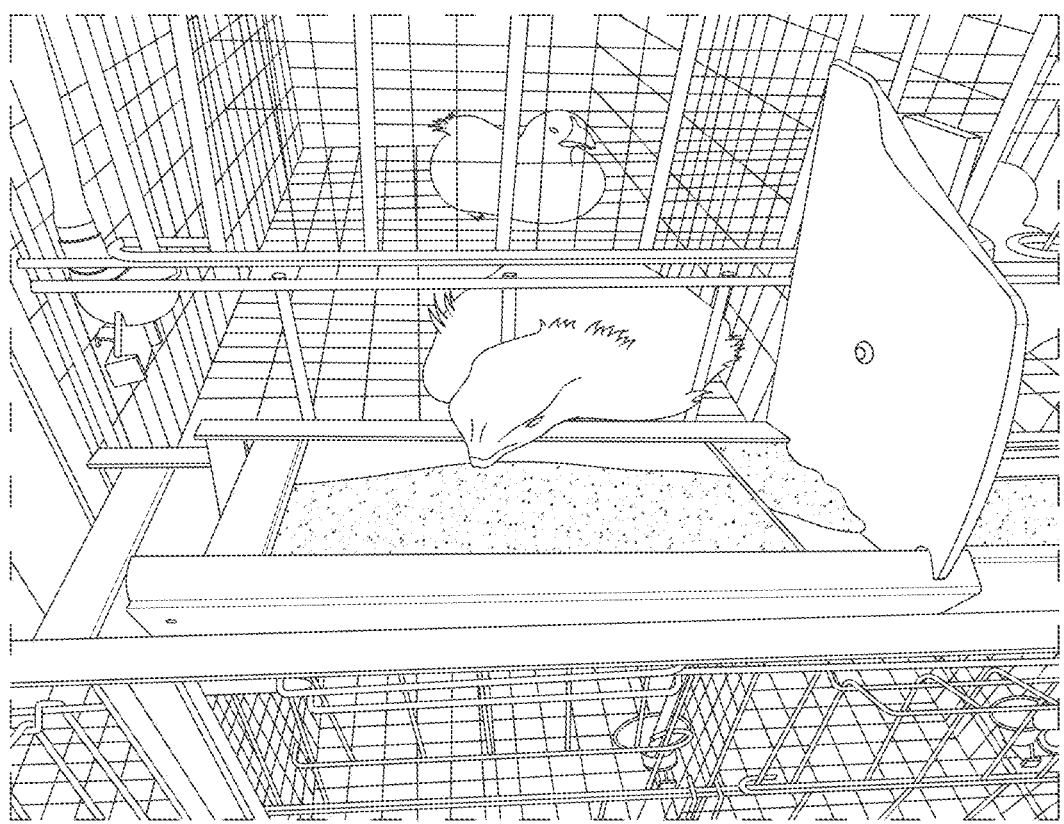

Reference is made to FIG. 4 which illustrates pictures of chickens, whereas from day 14, onward all chicks were transferred to individual cages with individual feeders in which each individual chick was housed on its own (n=40 per treatment).

Statistics

All data were subjected to statistical analysis using one-way Analysis of Variance (ANOVA). Values that differed (at a level of $p<0.05$) were considered statistically significant. In addition, Tukey-Kramer test was conducted comparing the treatment averages.

Results:

Body Weight and Growth Rate:

The growth of the hatchlings up to age of 35 d, clearly indicates that the dietary treatments had a significant effects on broilers BW.

Reference is made to FIG. 5 which illustrates a table demonstrating the mean BW measured when the birds were held in brooding cages (BC, from day of hatch to d17), and in individual cages (IC, from d 17 to the end of the trial on d 35), in chicks from the additive treatments.

Figure 6:
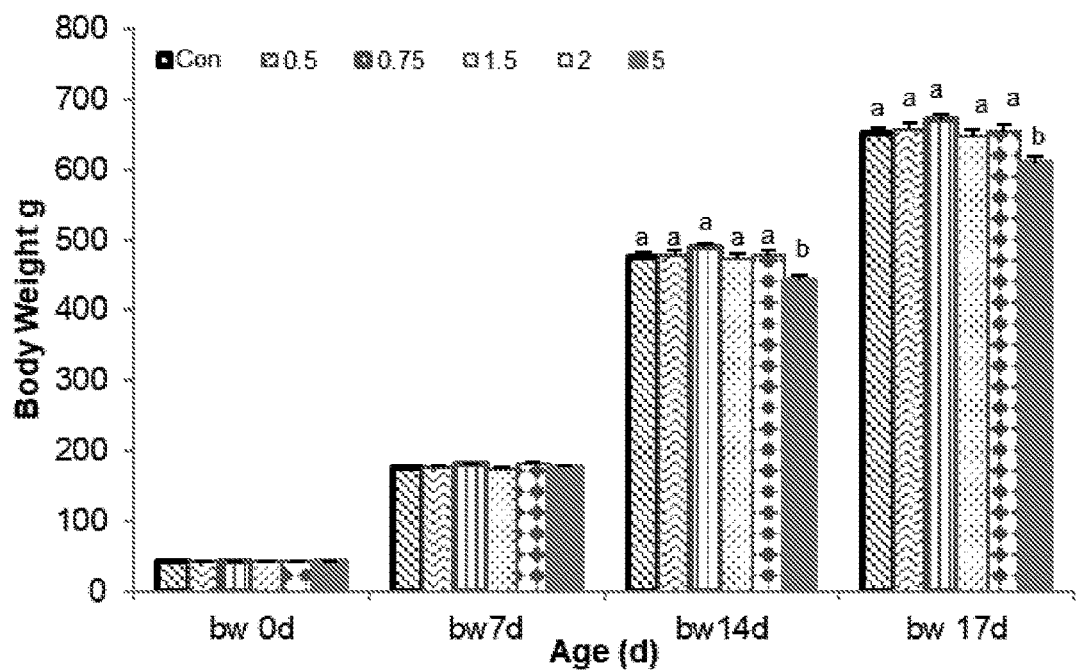
FIG. 6 depicts graphs 6A and 6B which illustrate the mean body weight of chicks Vs. Age (days) when fed with a Polyhalite enriched feed in various concentrations, in accordance with some demonstrative embodiments.
Figure 6:
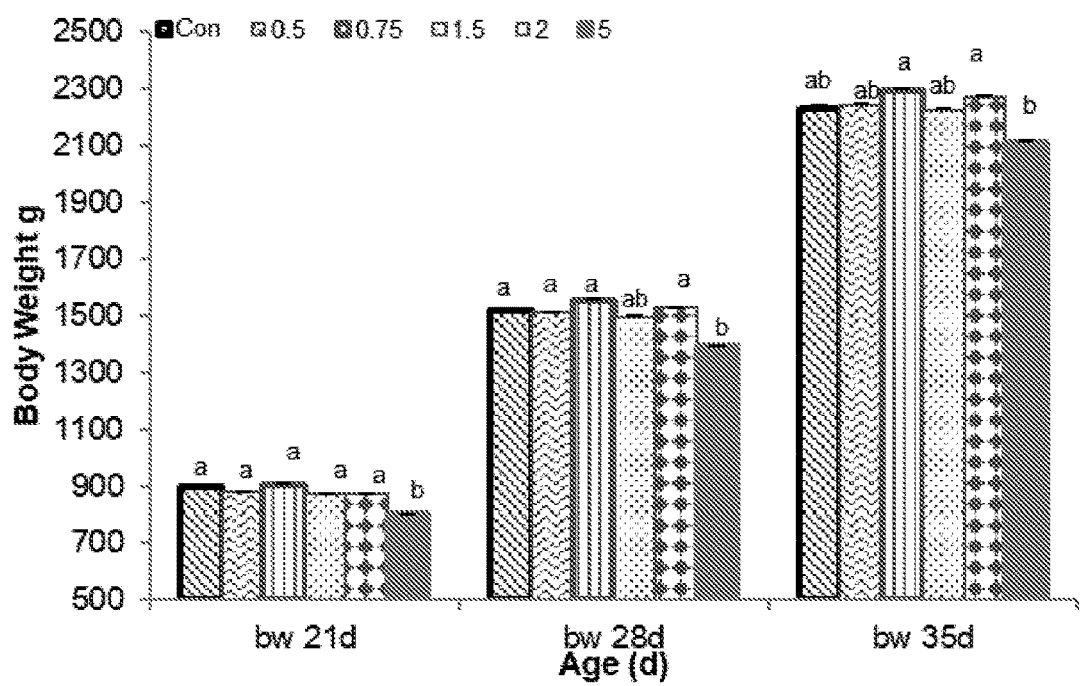

FIG. 6 depicts graphs 6A and 6B which illustrate the mean body weight of chicks Vs. Age (days) when fed with a Polyhalite enriched feed in various concentrations, in accordance with some demonstrative embodiments.

Graph 6A illustrates the mean BW (g) measured when the birds were held in brooding cages from day of hatch to day 17 in chicks from the different additive treatments.

Graph 6B illustrates the mean (g) BW measured when the birds were held in individual cages from day 17 to the end of the trial on day 35, in chicks from the different additive treatments.

The chicks feed with the 5% PS dietary treatment were found to have significantly lower weight compared with all chicks from other dietary treatments on d14, d17 and d21, and from the chicks fed with control, 0.5, 0.75 and 2% diets on d28. At the end of the experiment at d35 the chicks fed the 5% PS diet differed significantly only from chicks that were fed with 0.75 and 2% diets. It can be seen that supplying the birds with 5% Polyhalite damaged the chick's performance already at the second week, with lower daily growth rate (See FIGS. 7 and 8) and significantly lower BW, feeding the chicks with 0.75 or 2% Polyhalite resulted in improved performance.

Reference is made to FIG. 7 which illustrates a table demonstrating the mean WG calculated when the birds were held in brooding cages (BC, from day of hatch to d 17), and in individual cages (IC, from d 17 to the end of the trial on d 35), in chicks from the additive treatments.

Figure 8:
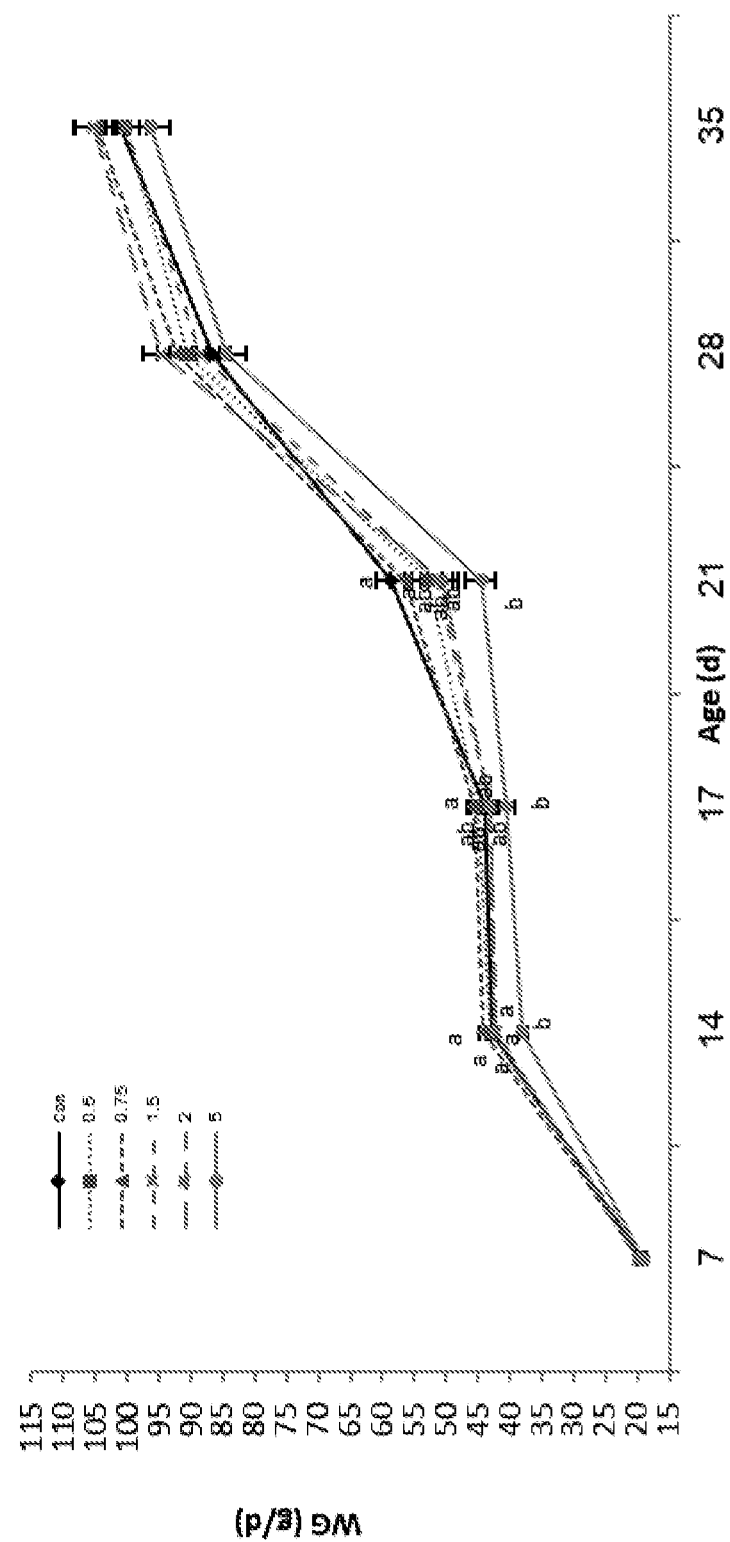
FIG. 8 illustrates a graph depicting the mean WG (g/d) measured from day of hatch to the end of the trial on day 35, in chicks from the different additive treatments, in accordance with some demonstrative embodiments.

Reference is also made to FIG. 8 which illustrates a graph depicting the mean WG (g/d) measured from day of hatch to the end of the trial on day 35, in chicks from the different additive treatments.

Chicks from both of these two dietary treatments (0.75 and 2%) reached the highest BW at d35. This heavy BW was a result of a faster daily growth, exhibited by those chicks especially during the last two weeks of the growing period (as shown in FIG. 8).

Feed Intake and Feed Conversion Rate (FCR):

During the first two weeks it was impossible to separate between the chicks, measure individual feed intake and calculate individual FCR.

Reference is now made to FIG. 9, which illustrates a table representing the mean BW, Feed intake and FCR calculated when the birds were held in brooding cages (BC, from day of hatch to d 17), and in individual cages (IC, from d 17 to the end of the trial on d 35), in chicks from the additive treatments.

Figure 10:
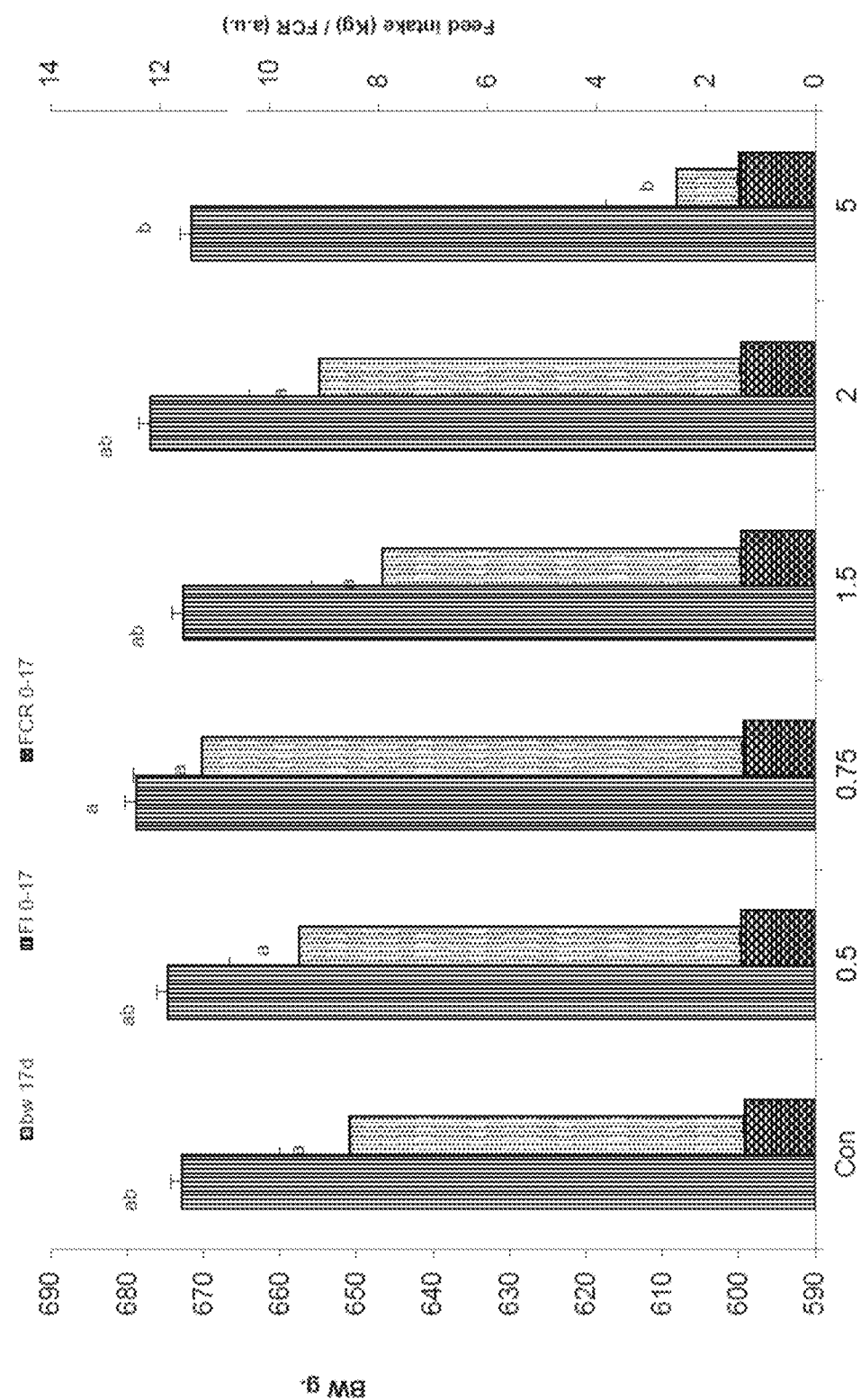
FIG. 10 illustrates a graph depicting the mean BW (g), Feed intake (Kg) and FCR (a.u.), in accordance with some demonstrative embodiments.

Reference is made to FIG. 10 which illustrates a graph depicting the mean BW (g), Feed intake (Kg) and FCR (a.u.) calculated for 17 day old birds held in brooding cages (n=4) from day of hatch to day 17.

Data provided in FIGS. 9 and 10 represents group mean feed intake and FCR from day of hatch to d17 (n=4).

Although the 5% PS dietary broiler chicks had consumed less feed than the rest of the treatments their FCR value was the worst with 1.39 compare to the 1.29 calculated for the control feed chicks.

Those chicks did not grow as well as the rest of the chicks; they needed more feed per one g of BW in order to gain weight.

While the 0.75 chicks mean group feed intake was the highest compared to the rest of the treatments, their FCR was lower compared with chicks fed with the 0.5, 1.5, 2 and 5% Polyhalite diets. The 0.75 chicks FCR was found to be similar to that calculated for the control chicks with value of 1.31 vs. 1.29, respectively. Even though these chicken had consumed in general more feed they exhibited an accelerated growth which led to a better FCR compared to the rest of the Polyhalite diets.

The average individual food efficiency, calculated over three weeks (days 17-35), showed that food consumption efficiency of broilers fed with 5% Polyhalite diet was worst (higher FCR value) than the rest of the diets, and as stated, the diet had a negative effect on growth rate and final BW.

The 0.5, 0.75 and 2% Polyhalite dietary treatments resulted in advantageous food conversion at the end of the growth period in comparison to the control.

Figure 11:
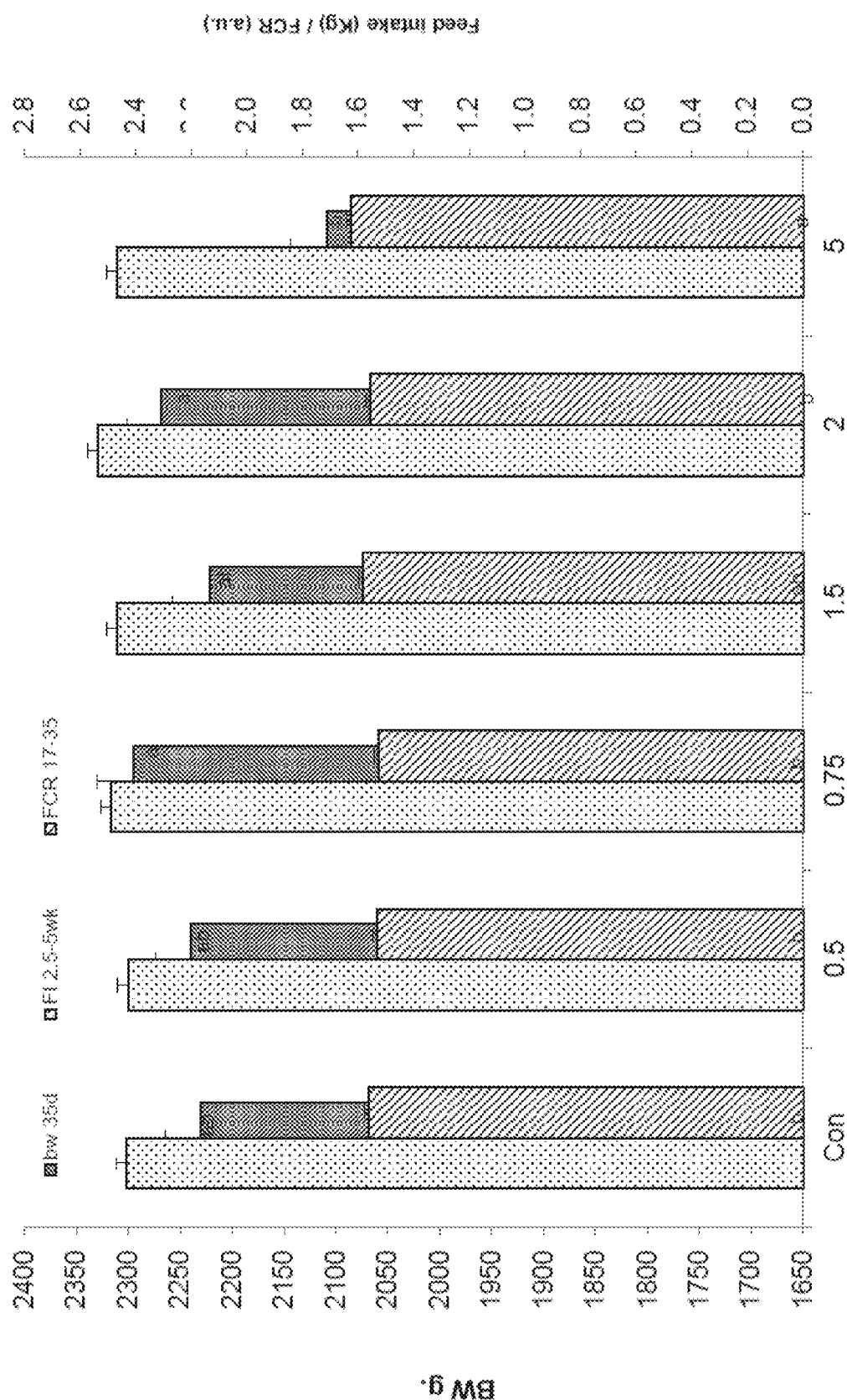
FIG. 11 illustrates a graph depicting the mean BW (g) Feed intake (Kg) and FCR (a.u.), in accordance with some demonstrative embodiments.

Reference is now made to FIG. 11, which illustrates a graph depicting the mean BW (g) Feed intake (Kg) and FCR (a.u.) calculated for 35 day old birds held in individual cages from day 17 to day 35.

In terms of food intake, it was similar between broilers of all treatments, but the 0.5, 0.75 and 2% Polyhalite diet groups grew better compared to the control until the age of 35 days.

Breast Meat Yield and Slaughter Parameters:

Slaughter took place on day 36, following 12 hours without feeding. At the time of slaughter, the BW of chicken feed with 0.75 or 2% Polyhalite diets were slightly higher than that of the control group. In contrast, the average slaughter BW of the 5% Polyhalite diet was significantly lower (2,023 g in the 5% Polyhalite diet, compared to 2,121 g in the control diet, respectively).

Reference is now made to FIG. 12 which illustrates a table demonstrating the effect of the additive treatments on slaughter BW, relative breast at slaughter and after 48 h, abdominal fat, heart and liver weights (% from slaughter BW) at the age.

The 0.75% Polyhalite diets chicks had a heaviest breast with a greater relative breast weight, at slaughter as well as 48 h post mortem. Both 0.75% and control chicks had similar breast muscle water holding capacity, in both these diet treatments the breast muscle lost only 1.5% from its total weight following 48 h wait post mortem.

Other organ weight data obtained following slaughter indicated that there is no advantage to any of the diet treatments in terms of the relative fat weight. In the 5% Polyhalite diet a relatively high liver weight was found as well as a significantly higher relative weight of the heart (See FIG. 12).

In order to better understand the effects of the different Polyhalite level diets the experiment was designed in a manner that will enable proper and precise monitoring. In the current experiment, a positive significant influence was found for the 0.75% Polyhalite diet.

Although the 2% Polyhalite diet did not influence broilers performance as well as the 0.75 Polyhalite diet did, the chicks in this treatment grew better during the first week and no early mortality occurred during the brooding period (0-17 d).

In comparison: the rest of the diet treatment groups exhibited mortality ranging between 1-5%. In addition, in this group only one chick died from 17 d onward. Furthermore, during the last two weeks chicks from this diet group had exhibited the highest daily growth and reached a similar BW to that of the 0.75% diet treatment.

Figure 13:
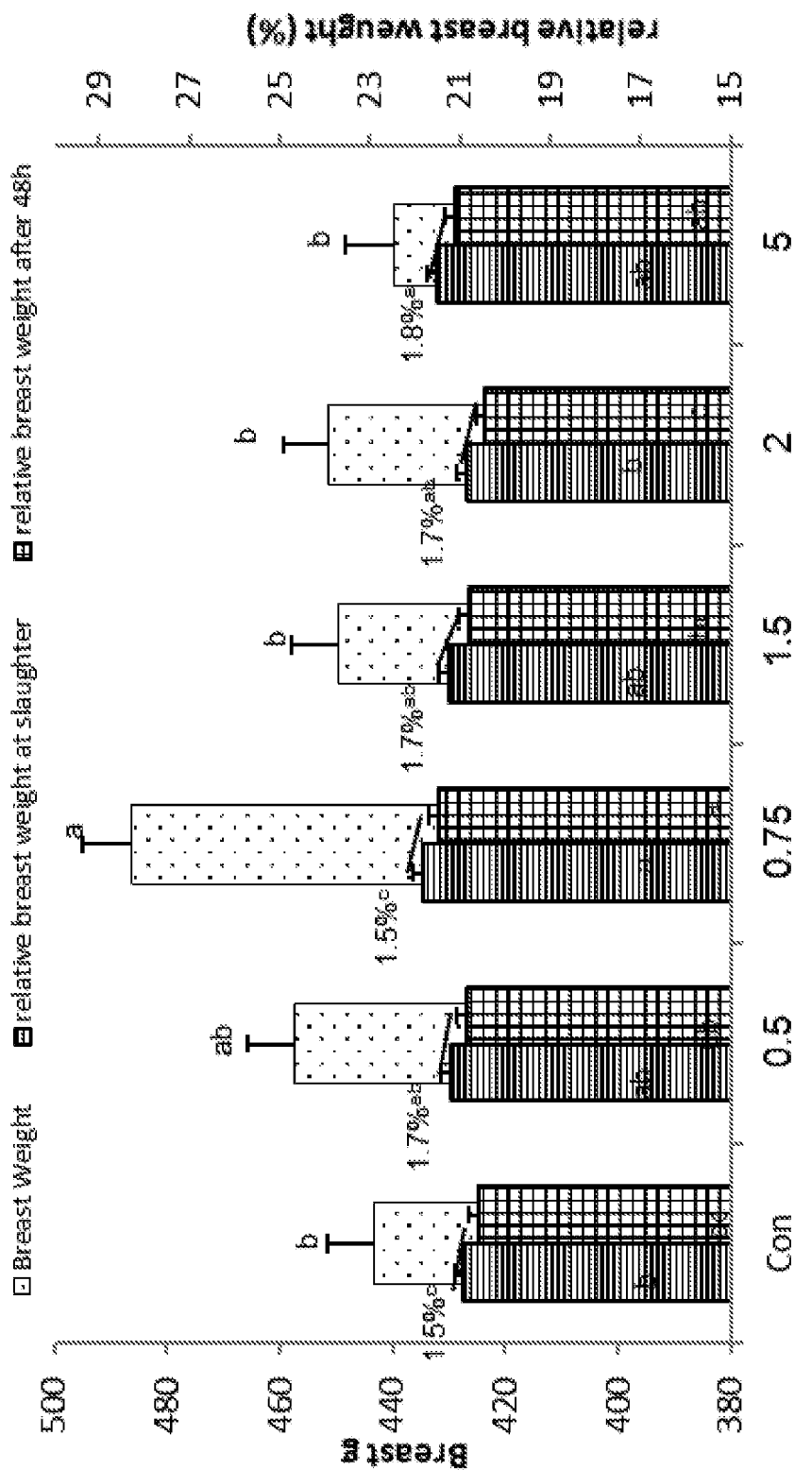
FIG. 13 illustrates a graph depicting the mean breast weight (g), and relative breast weight (%) at slaughter time and 48 h post-mortem for chickens from different additive treatments, in accordance with some demonstrative embodiments.

Reference is made to FIG. 13, which illustrates a graph depicting the mean breast weight (g), and relative breast weight (%) at slaughter time and 48 h post-mortem, for chickens from different additive treatments.

Figure 14:
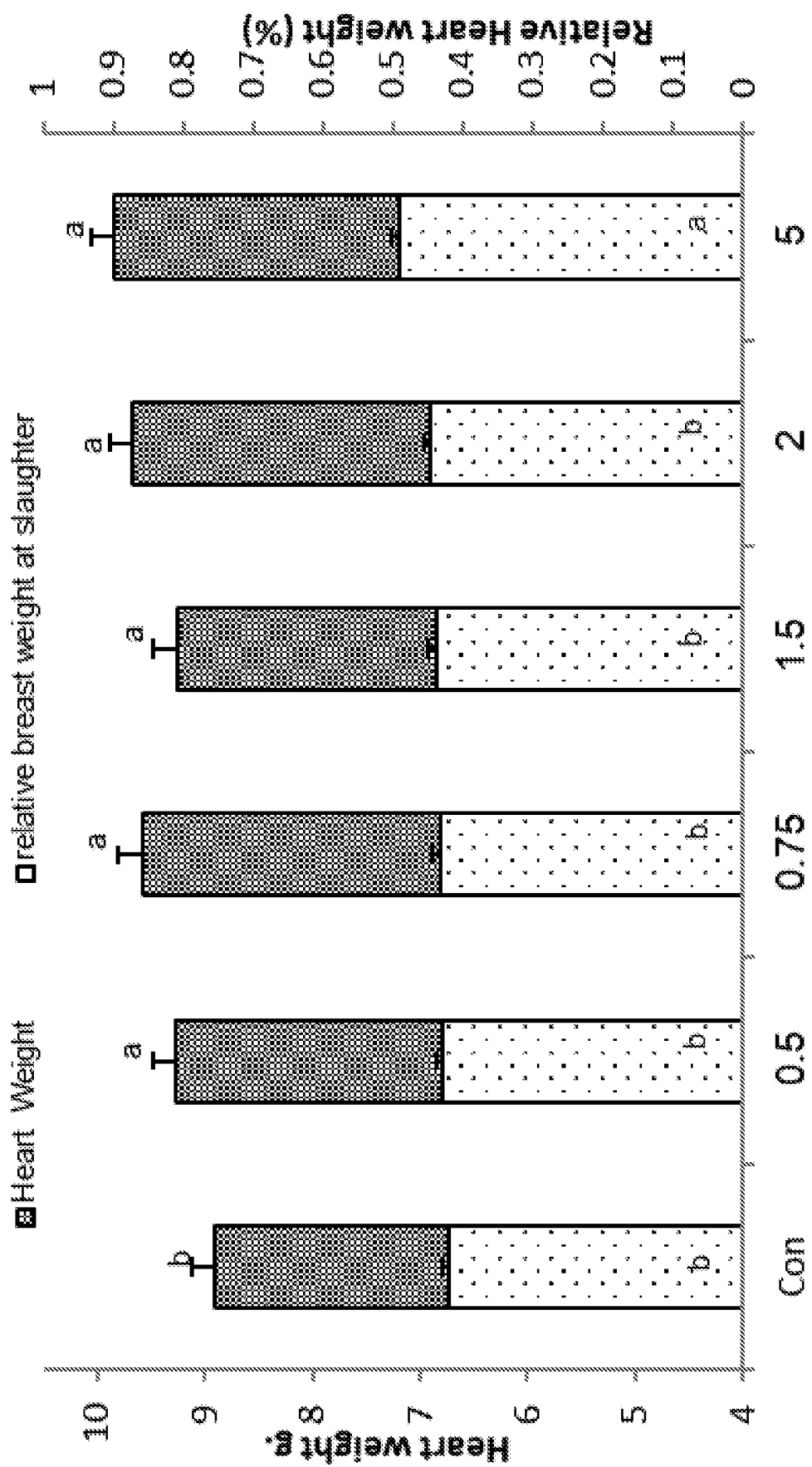
FIG. 14 illustrates a graph depicting the mean Heart weight (g), and relative heart weight (%) at slaughter time for chickens from different additive treatments, in accordance with some demonstrative embodiments.

Reference is made to FIG. 14, which illustrates a graph depicting the mean Heart weight (g), and relative heart weight (%) at slaughter time for chickens from different additive treatments.

Example 2

Growth and feed utilization study was conducted with juvenile Nile tilapia (*Oreochromis niloticus*) fish.

An initial experiment was conducted in order to assess the effect of Polyhalite addition to the diet on feed consumption by the fish. In this experiment, the fish were housed individually in glass aquariums of 40 liters each that were all connected to a central biofilter. A total of 22 aquariums were employed. Eleven received the control feed with no addition of Polyhalite and 11 received the control feed with the addition of Polyhalite at a level of 2%.

The fish were reared in this system for a period of one month. During this period, they were fed twice daily (7 days a week). In order to monitor the effect of Polyhalite on feed consumption, the fish were hand fed twice a day ad libitum from a preweighed container for each aquarium, and at the end of each day the amount of feed consumed was registered.

The results of this experiment showed that there was no effect of Polyhalite addition on food consumption but the fish receiving the Polyhalite at a level of 2% exhibited significantly better growth (Table 3) and FCR (Table 4). The Feed Conversion Ratio (FCR) is the amount of feed (in kg) ingested by an animal which can be converted into one kg of live weight.

Of the 22 fish that participated in the experiment 2 fish (one in each treatment) did not grow and exhibited an exceptionally high FCR. The results obtained are therefore presented with and without these out-layers. It can be seen that the growth of the fish receiving the addition of Polyhalite was significantly higher even when the out-layer fish was included.

TABLE 3

| Specific growth rate SGR = % growth per day | |
|---|---|
| FP (+Poly) | SGR F (no Poly) |
| 0.990838 | 0.761051 |
| 0.803056 | 0.867135 |
| 1.37285 | 0.787963 |
| 1.75265 | 0.661565 |
| 1.141131 | 0.758872 |
| 1.642312 | 1.098095 |
| 0.849444 | 0.568173 |
| 1.076309 | 0.532331 |
| 0.986261 | 1.204034 |
| 1.047631 | 0.780532 |
| 0.39065 | 0.316017 |

Without 2 out-layer fish Anova: Single Factor
SUMMARY

| Variance | Average | Sum | Count | Groups |
|---|---|---|---|---|
| 0.044984 | 0.801975 | 8.019751 | 10 | F |
| 0.103491 | 1.166248 | 11.66248 | 10 | FP |

TABLE 3-continued

Specific growth rate SGR = % growth per day

ANOVA

| F crit | P-value | F | MS | df | SS | Source of Variation |
|---|---|---|---|---|---|---|
| 4.413873 | 0.007863 | 8.937181 | 0.663474 | 1 | 0.663474 | Between Groups |
| | | | 0.074237 | 18 | 1.336275 | Within Groups |
| | | | | 19 | 1.999749 | Total |

With all fish Anova: Single Factor
SUMMARY

| Variance | Average | Sum | Count | Groups |
|---|---|---|---|---|
| 0.061955 | 0.757797 | 8.335767 | 11 | F |
| 0.147828 | 1.095739 | 12.05313 | 11 | FP |

ANOVA

| F crit | P-value | F | MS | df | SS | Source of Variation |
|---|---|---|---|---|---|---|
| 4.351244 | 0.023762 | 5.988353 | 0.628127 | 1 | 0.628127 | Between Groups |
| | | | 0.104891 | 20 | 2.097828 | Within Groups |
| | | | | 21 | 2.725954 | Total |

TABLE 4

Feed conversion rate (FCR)

| F | FP |
|---|---|
| 1.32491 | 1.023333 |
| 1.08312 | 1.050441 |
| 1.13 | 0.951698 |
| 1.557203 | 0.725908 |
| 1.625461 | 0.942825 |
| 1.12 | 0.771472 |
| 1.769048 | 1.430669 |
| 2.288754 | 1.33463 |
| 0.916978 | 1.537618 |
| 1.27551 | 1.055126 |
| 4.407821 | 3.668085 |

Anova: Single Factor Without 2 out-layer fish
SUMMARY

| Groups | Count | Sum | Average | Variance |
|---|---|---|---|---|
| F | 10 | 14.09098 | 1.409098 | 0.16744 |
| FP | 10 | 10.82372 | 1.082372 | 0.073079 |

ANOVA

| Source of Variation | SS | df | MS | F | P-value | F crit |
|---|---|---|---|---|---|---|
| Between Groups | 0.53375 | 1 | 0.53375 | 4.438319 | 0.049434 | 4.413873 |
| Within Groups | 2.164672 | 18 | 0.12026 | | | |
| Total | 2.698422 | 19 | | | | |

With all fish Anova: Single Factor
SUMMARY

| Groups | Count | Sum | Average | Variance |
|---|---|---|---|---|
| F | 11 | 18.49881 | 1.68171 | 0.968181 |
| FP | 11 | 14.49181 | 1.317437 | 0.673582 |

TABLE 4-continued

Feed conversion rate (FCR)

ANOVA

| Source of Variation | SS | df | MS | F | P-value | F crit |
|---|---|---|---|---|---|---|
| Between Groups | 0.72982 | 1 | 0.72982 | 0.889069 | 0.356981 | 4.351244 |
| Within Groups | 16.41763 | 20 | 0.820881 | | | |
| Total | 17.14745 | 21 | | | | |

Following the initial experiment that showed positive results, a larger experiment was deployed, in which different levels of Polyhalite were added to the diet of the fish.

One thousand experimental fish were brought to the lab and maintained for 2 weeks to acclimatize them to the lab conditions. Fish were then randomly housed at a density of 20 fish/tank, each tank contained a total of 250 liters of water. Every six tanks were connected to a central biofilter through which the water was constantly circulated and purified. The test feed used as control was a commercial feed containing 35% protein and 4% fat that is currently being used by fish farmers. To this control feed (C) Polyhalite (Standard grade) at levels of 1%, 2%, 3%, 4% and 5% was added. Each of the diets was tested in 6 replicates—a total of 36 tanks were used. Prior to the beginning of the experiment, the experimental fish were weighed and the very small or large fish were removed. Fish were then randomly stocked in the experimental tanks. Fish were hand fed extruded pellets of 2 mm diameter; feed was distributed twice a day early in the morning and late in the afternoon.

All the fish in each tank weighed every 2 weeks in order to follow their growth rate as well as update the feeding level, initially set at 5% of the body mass per day. Food consumption level was recorded daily. The experiment was closely monitored and the fish fed 7 days a week. Levels of ammonia and nitrate in the rearing water were monitored and water quality maintained. The fish were kept under optimal growing conditions throughout the experimental growth period, which lasted 2 months.

Growth results were obtained and FCR was calculated for all treatments.

The results showed no significant differences among all the tested diets.

The most expensive of the main components in the feed is the protein and therefore the average cost of feed for fish is around 1 US dollar per kg. The following is the suggested mode of action for the experiments:

Prior to initiation of the experiments, a preliminary test was conducted in order to verify that the Polyhalite does not have a negative effect on the fish. Recognition of bitter taste and aversion exist in order to protect organisms against the ingestion of poisonous food compounds, which are often bitter. It is interesting to note that bitter taste receptors are found not only in the mouth but also in other tissues, such as the gastrointestinal tract, indicating that they may also play a role in the digestive and metabolic processes. Therefore, the preliminary tests to verify that the fish do not perceive Polyhalite as a bitter/harmful substance were vital since high levels of Potassium might elicit a bitter taste.

The Polyhalite was added on top of the regular diet components leading to a proportional reduction in all the other ingredients of the diet. Under these circumstances, it is suggested to replace fish diet ingredients that cost 1 dollar with a much cheaper ingredient Polyhalite, which may cost less than half the cost of the feed ingredients and save on the cost of the feed.

Throughout the experiments, the fish were hand fed to better control the feed intake and monitor the animal behavior.

Figure 15:
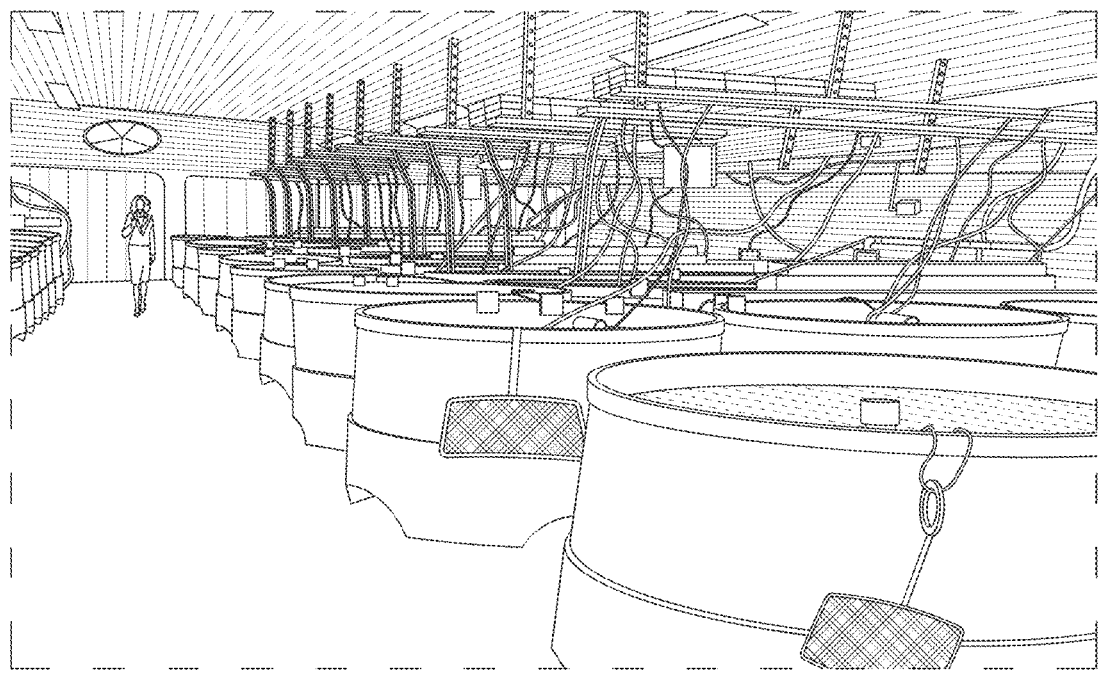
FIG. 15 depicts pictures of a Fish Rearing Facility, in accordance with some demonstrative embodiments.
Figure 15:
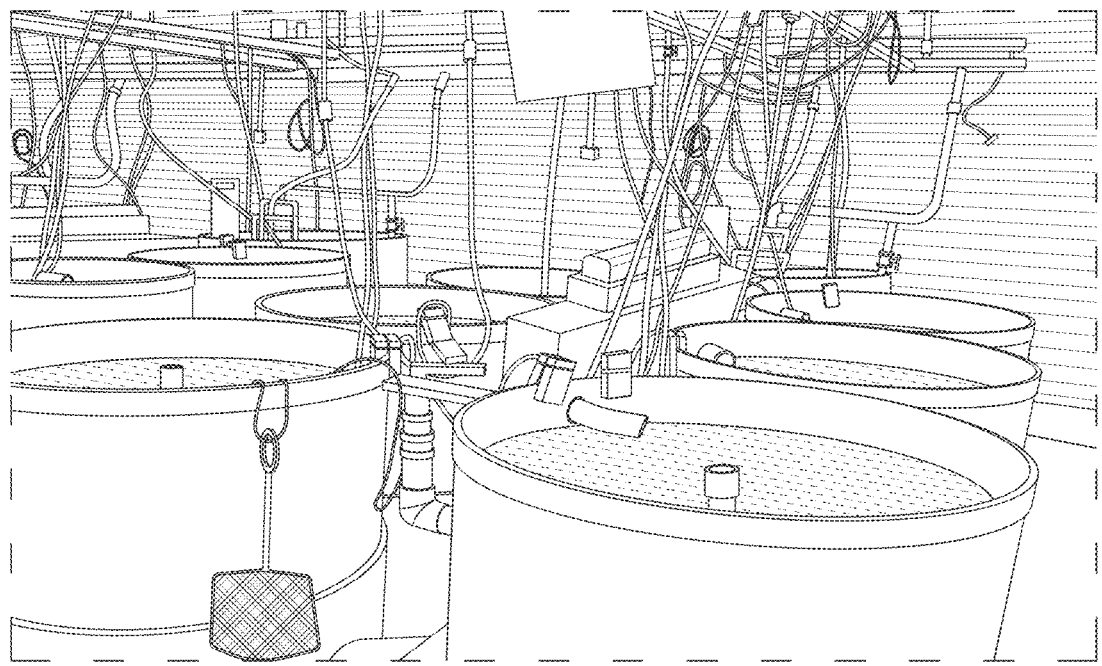

Reference is now made to FIG. 15 which depicts pictures of a Fish Rearing Facility, in accordance with some demonstrative embodiments.

The Aquaculture holding facility is situated within an insulated building and has 2 sets of 36 experimental round plastic tanks of 250 liters each, every 6 tanks are connected to a central biofilter. In addition, there are large glass aquariums in which fish can be held and monitored while they are acclimatized to the laboratory conditions. Growing conditions are carefully monitored and the fish are provided with optimal rearing conditions that include proper aeration, heating and water quality regulation. Depending on the size of the fish and their species, it is possible to hold a few thousand fish at one time in the facility.

Example 3

Table 5 shows a Feed Conversion Rate (FCR) for fish fed a diet containing 2% Polyhalite (FCR=amount of feed given in order to obtain growth)

The results of this experiment showed that Normal fed fish required 1.41 Kg of ordinary feed to generate 1 Kg of fish weight, whereas fish fed with the addition of polyhalite required 1.08 Kg feed to generate 1 Kg of fish weight.

Accordingly it is clear that fish feed enriched with polyhalite causes the fish to consume less feed to get a target weight.

TABLE 5

Anova: Single Factor
SUMMARY

| Groups | Count | Sum | Average | Variance |
|---|---|---|---|---|
| F | 10 | 14.09098 | 1.409098 | 0.16744 |
| FP (with the addition of PolySulphate) | 10 | 10.82372 | 1.082372 | 0.073079 |

TABLE 5-continued

| ANOVA | | | | | | |
|---|---|---|---|---|---|---|
| Source of variation | SS | df | MS | F | P-value | F crit |
| Between groups | 0.53375 | 1 | 0.53375 | 4.438319 | 0.049434 | 4.413873 |
| Within groups | 2.164672 | 18 | 0.12026 | | | |
| Total | 2.698422 | 19 | | | | |

Table 6 shows Specific Growth Rate (SGR) for fish fed a diet containing 2% Polyhalite, wherein Specific Growth Rate of normally fed fish was 0.8% and the Specific Growth Rate of fish fed with polyhalite was 1.17%.

Accordingly it is clear that fish fed with polyhalite enriched food demonstrated a faster growth rate.

TABLE 6

| Anova: Single Factor SUMMARY | | | | |
|---|---|---|---|---|
| Variance | Average | Sum | Count | Groups |
| 0.044984 | 0.801975 | 8.019751 | 10 | F |
| 0.103491 | 1.166248 | 11.66248 | 10 | FP with PolySuiphate |

| ANOVA | | | | | | |
|---|---|---|---|---|---|---|
| F crit | P-value | F | MS | df | SS | Source &Variation |
| 4.413873 | 0.007863 | 8.937181 | 0.663474 | 1 | 0.663474 | Between Groups |
| | | | 0.074237 | 18 | 1.336275 | Within Groups |
| | | | | 19 | 1.999749 | Total |

Example 4

Polyhalite was added as a feed additive at graded levels (1, 2, 3, 4 and 5%) to the regular commercial diet of the fish manufactured by Zemach Feed Mill diet number 4622 containing 35% protein; 4% fat; 5% fiber; 1.2% phosphorous; 1.2% calcium. The Polyhalite was added to the above feed formula on top of the prepared diet. Thus, the percent of added Polyhalite is proportionally subtracting each of the diet ingredients.

The pellet diameter was 2.5 mm and at the beginning of the experiment (during the initial 2 weeks), the pellets were partially crushed to enable smaller fish to consume the feed.

Throughout the experiments, the fish were hand fed to better control the feed intake and monitor the animal behavior. Food was provided twice daily—early morning and afternoon.

The experiments were divided into an initial experiment with individually housed fish to explore the effects of Polyhalite addition on food consumption. This preliminary experiment was conducted in order to evaluate the acceptance of polyhalite by the fish. Since, it is possible that the fish perceive this substance as repelling (bitter) and this might have affected their acceptance and consumption of the feed. Following this experiment in which no negative effects on feed consumption were found we conducted 2 additional experiments. The first was with fish held in individual tanks and the second in communal tanks.

Experimental Design

Fish

Growth and feed utilization study was conducted with juvenile male Nile tilapia (Oreochromis niloticus) fish.

An initial experiment was conducted in order to assess the effect of Polyhalite addition to the diet on feed consumption and growth. In this experiment, the fish were housed individually in glass aquariums each containing 40 liters that were all connected to a central biofilter. A total of 22 aquariums were employed. 11 received the control feed with no addition of Polyhalite and 11 received the control commercial feed manufactured by Zemach Feed Mill diet number 4622 containing 35% protein; 4% fat; 5% fiber; 1.2% phosphorous; 1.2% calcium. This feed was then enhanced with the addition of Polyhalite at a level of 2%.

The fish were reared in this system for a period of one month at a temperature of 26±1° C. During this period, they were fed twice daily (7 days a week). In order to monitor the effect of Polyhalite on feed consumption and growth the fish were hand fed twice a day ad libitum from a pre weighed container for each aquarium and at the end of each day, the amount of feed consumed was registered.

The results of this experiment showed that the addition of Polyhalite had no negative effect on food consumption and the fish receiving the Polyhalite at a level of 2% exhibited better growth (Table 7) and better FCR (Table 8). The Feed Conversion Ratio (FCR) is the amount of feed (in kg) consumed by an animal leading to a gain of one kg live weight.

Following the initial experiment that showed positive results, we moved to the large experiment in which different levels of Polyhalite were added to the diet of the fish.

Experimental Setup

One thousand experimental fish were brought to our lab and maintained for 2 weeks to acclimatize them to the lab conditions. Fish were then randomly housed at a density of 15 fish/tank each tank contained a total of 250 liters of water. Every six tanks were connected to a central biofilter through which the water was constantly circulated and purified circulation rate was equivalent to total tank volume replacement every 1.5 hours. The test feed used as control was a commercial extruded feed that is currently being used by fish farmers (for details see above). To this control feed (C) we added 1%, 2%, 3%, 4% and 5% Polyhalite (Standard grade). Each of the diets was tested in 6 replicates—a total of 36 tanks were used. Prior to the beginning of the experiment, the experimental fish were weighed and the very small or large fish were removed. Fish were then randomly stocked in the experimental tanks.

All the fish in each tank were weighed every 2 weeks in order to follow their growth rate as well as update the feeding level, set at 5% of the body mass per day. Food consumption level was recorded. Levels of ammonia and nitrate in the rearing water were monitored twice a week and water quality maintained. Water temperature was 26±1° C. The fish were kept under optimal growing conditions throughout the experimental growth period, which lasted 6 weeks.

The growth results of this experiment (mean average weight and specific growth rate) are presented in Table 9 and 10. FCR calculated for all treatments is presented in Table 11.

TABLE 7

Individual growth rate (% per day) of fish fed a control feed and feed with the addition of 2% Polyhalite

| Feed with the addition of 2% Polyhalite | Control feed with no addition of Polyhalite |
| --- | --- |
| 0.991 | 0.761 |
| 0.803 | 0.867 |
| 1.373 | 0.788 |
| 1.753 | 0.662 |
| 1.141 | 0.759 |
| 1.642 | 1.098 |
| 0.849 | 0.568 |
| 1.076 | 0.532 |
| 0.986 | 1.204 |
| 1.048 | 0.781 |
| Average 1.166 | 0.802 |

The obtained difference in growth rate was highly significant ($P < 0.00786$)

TABLE 8

Individual Feed Conversion Ratio of fish fed a control feed and feed with the addition of 2% Polyhalite

| Feed with the addition of 2% Polyhalite | Control feed with no addition of Polyhalite |
| --- | --- |
| 1.023 | 1.325 |
| 1.050 | 1.083 |
| 0.952 | 1.130 |
| 0.726 | 1.557 |
| 0.943 | 1.625 |
| 0.771 | 1.120 |
| 1.431 | 1.769 |
| 1.335 | 2.289 |
| 1.538 | 0.917 |
| 1.055 | 1.276 |
| Average 1.082 | 1.409 |

The obtained difference in FCR was significant at $P < 0.0494$

TABLE 9

Mean average weight at the end of the experiment (initial weight 2.6 gr)

| Treatment | Mean weight In grams | Significance ($p < 0.05$) | Survival |
| --- | --- | --- | --- |
| Control feed No Polyhalite | 16.72 ± 0.06 | b | 100% |
| Control feed + 1% Polyhalite | 17.57 ± 0.08 | a | 96% |
| Control feed + 2% Polyhalite | 16.25 ± 0.05 | b | 100% |
| Control feed + 3% Polyhalite | 16.30 ± 0.04 | b | 98% |
| Control feed + 4% Polyhalite | 16.15 ± 0.07 | b | 100% |
| Control feed + 5% Polyhalite | 15.30 ± 0.09 | c | 100% |

TABLE 10

Mean specific growth weight (SGR) at the end of the experiment

| Treatment | Mean specific growth rate | Significance ($p < 0.05$) | Survival |
| --- | --- | --- | --- |
| Control feed No Polyhalite | 4.51 ± 0.017 | b | 100% |
| Control feed + 1% Polyhalite | 4.59 ± 0.024 | a | 96% |
| Control feed + 2% Polyhalite | 4.48 ± 0.013 | b | 100% |
| Control feed + 3% Polyhalite | 4.47 ± 0.008 | b | 98% |
| Control feed + 4% Polyhalite | 4.38 ± 0.022 | b | 100% |
| Control feed + 5% Polyhalite | 4.28 ± 0.026 | bc | 100% |

TABLE 11

Mean Feed Conversion Rate (FCR) at the end of the experiment

| Treatment | Mean specific growth rate | Significance ($p < 0.05$) | Survival |
| --- | --- | --- | --- |
| Control feed No Polyhalite | 1.21 ± 0.003 | b | 100% |
| Control feed + 1% Polyhalite | 1.14 ± 0.008 | a | 96% |
| Control feed + 2% Polyhalite | 1.19 ± 0.006 | b | 100% |
| Control feed + 3% Polyhalite | 1.18 ± 0.007 | b | 98% |
| Control feed + 4% Polyhalite | 1.19 ± 0.008 | b | 100% |
| Control feed + 5% Polyhalite | 1.17 ± 0.009 | b | 100% |

CONCLUSIONS

The results of the experiments show that when Polyhalite is added to the fish diet at levels of 1-2% the growth results were better and the FCR was lower, meaning that less food is required in order to obtain the same growth. Addition of 3 or 4% resulted in slight retardation in growth but this was not significant. Adding 5% Polyhalite to the diet resulted in substantial growth retardation.

While this invention has been described in terms of some specific examples, many modifications and variations are possible. It is therefore understood that within the scope of the appended claims, the invention may be realized otherwise than as specifically described.

What is claimed is:

1. An animal feed composition comprising Polyhalite in a concentration between 0.5%-2% w/w, that is fed to poultry on a daily basis.

2. The composition of claim 1, wherein said composition is fed to the poultry and includes Polyhalite in a concentration between 0.75%-2% w/w.

3. The composition of claim 1, wherein said composition is fed to the poultry and includes Polyhalite in a concentration between 1%-2% w/w.

4. The composition of claim 1, wherein said composition is fed to the poultry and includes Polyhalite in a concentration between 1%-1.5% w/w.

* * * * *